United States Patent

Rohrbach et al.

[11] Patent Number: 4,865,149
[45] Date of Patent: Sep. 12, 1989

[54] RACK AND PINION STEERING GEAR

[76] Inventors: Wolfgang Rohrbach, Lanzelhohl 18, 6500 Mainz; Georg Grafenstein, Seelbacher Grund 34, 6272 Niedernhausen; Wilhelm Beer, Adam-Opel-Strasse 9, 6090 Russelsheim; Burghardt Kiy, Elbestrasse 55, 6090 Russelsheim; Eugen Monetha, Grundbachstrasse 39, 6090 Russelsheim, all of Fed. Rep. of Germany

[21] Appl. No.: 20,832

[22] Filed: Mar. 2, 1987

[30] Foreign Application Priority Data

Mar. 8, 1986 [DE] Fed. Rep. of Germany ....... 3633947

[51] Int. Cl.$^4$ .............................................. B62D 3/12
[52] U.S. Cl. ...................................... 180/148; 74/498
[58] Field of Search ........................... 180/148; 74/498

[56] References Cited

U.S. PATENT DOCUMENTS

| | | | |
|---|---|---|---|
| 3,665,783 | 5/1972 | Arnold | 74/498 |
| 4,189,955 | 2/1980 | Bishop | 74/498 |
| 4,428,450 | 1/1984 | Stenstrom et al. | 180/148 |
| 4,581,952 | 4/1986 | Yabe | 74/498 |
| 4,680,981 | 7/1987 | Downing | 74/498 X |

FOREIGN PATENT DOCUMENTS

| | | | |
|---|---|---|---|
| 2458320 | 6/1976 | Fed. Rep. of Germany | 180/148 |
| 57-73268 | 5/1982 | Japan | 74/498 |
| 59-48263 | 3/1984 | Japan | 180/148 |

*Primary Examiner*—Mitchell J. Hill

[57] ABSTRACT

A rack and pinion steering system, especially for motor vehicles, has a toothed rack that can be axially displaced in a steering gear housing, a pinion driven by the steering wheel and actuating the toothed rack, and a spring-loaded pressure part supported in the steering gear housing which serves to generate a certain pressure between the toothed rack and the pinion. Measures to raise the coefficient of friction which come into frictional contact with each other—in each case only in the region corresponding to straight-ahead driving—are provided on one or more surfaces of the steering system. As a result of such measures to increase the coefficient of friction at certain friction points in the steering system relating to straight-ahead motion of the vehicle, it is a simple matter to achieve an increase in steering torque in the center region of the steering system without the need for geometrical changes to the steering system or an increase in the pressure between the toothed rack and the pinion. The steering torque increase resulting from increased friction in the center region of the steering system compensates for the wear effects which are known to occur there after the vehicle has been operated for some time.

2 Claims, 5 Drawing Sheets

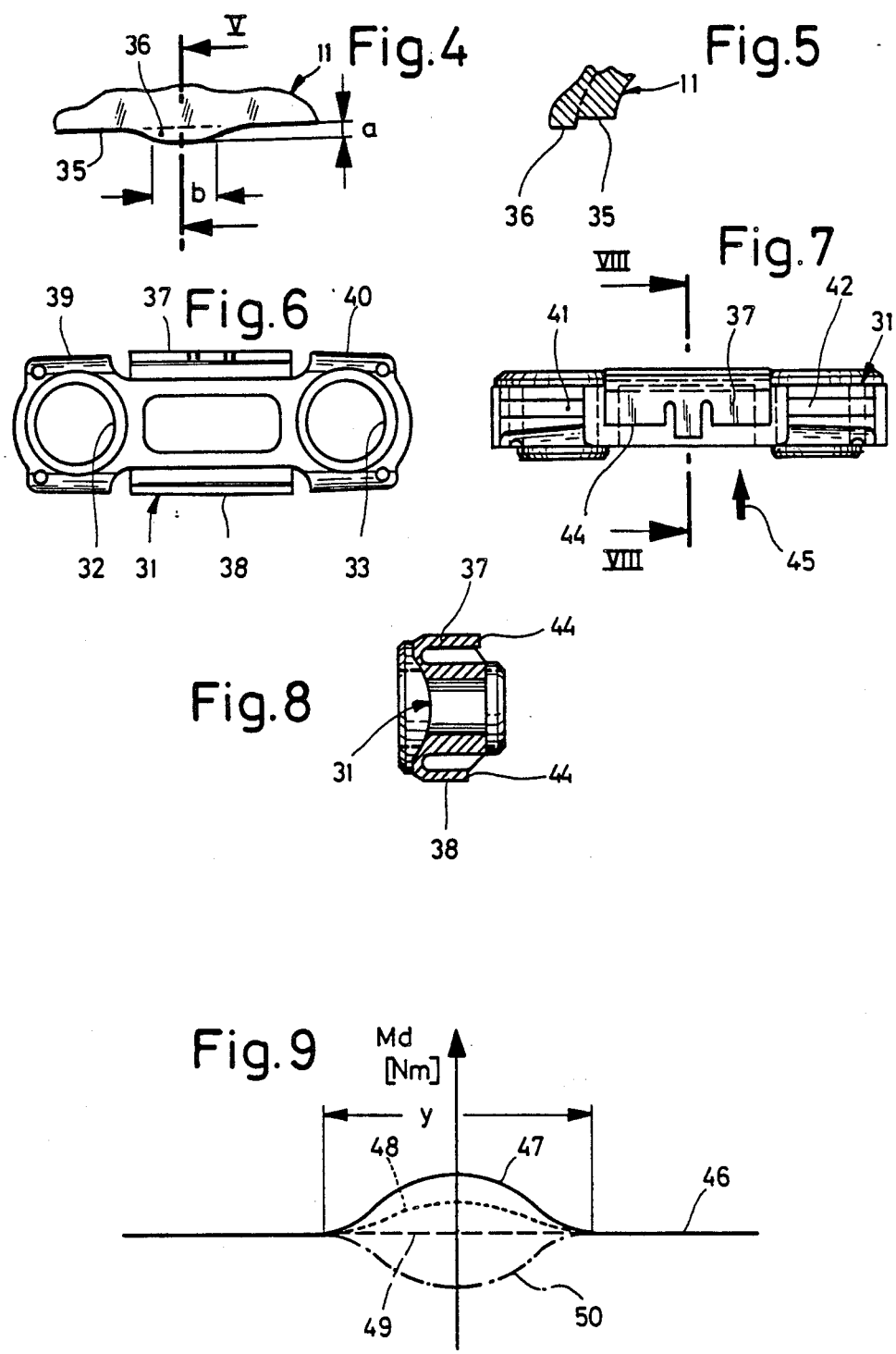

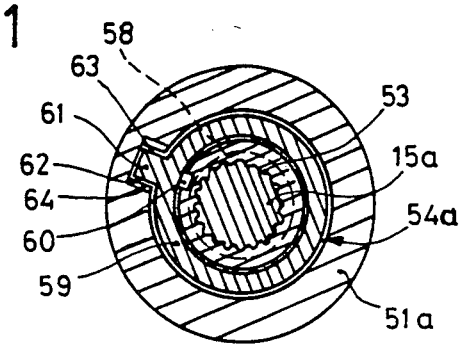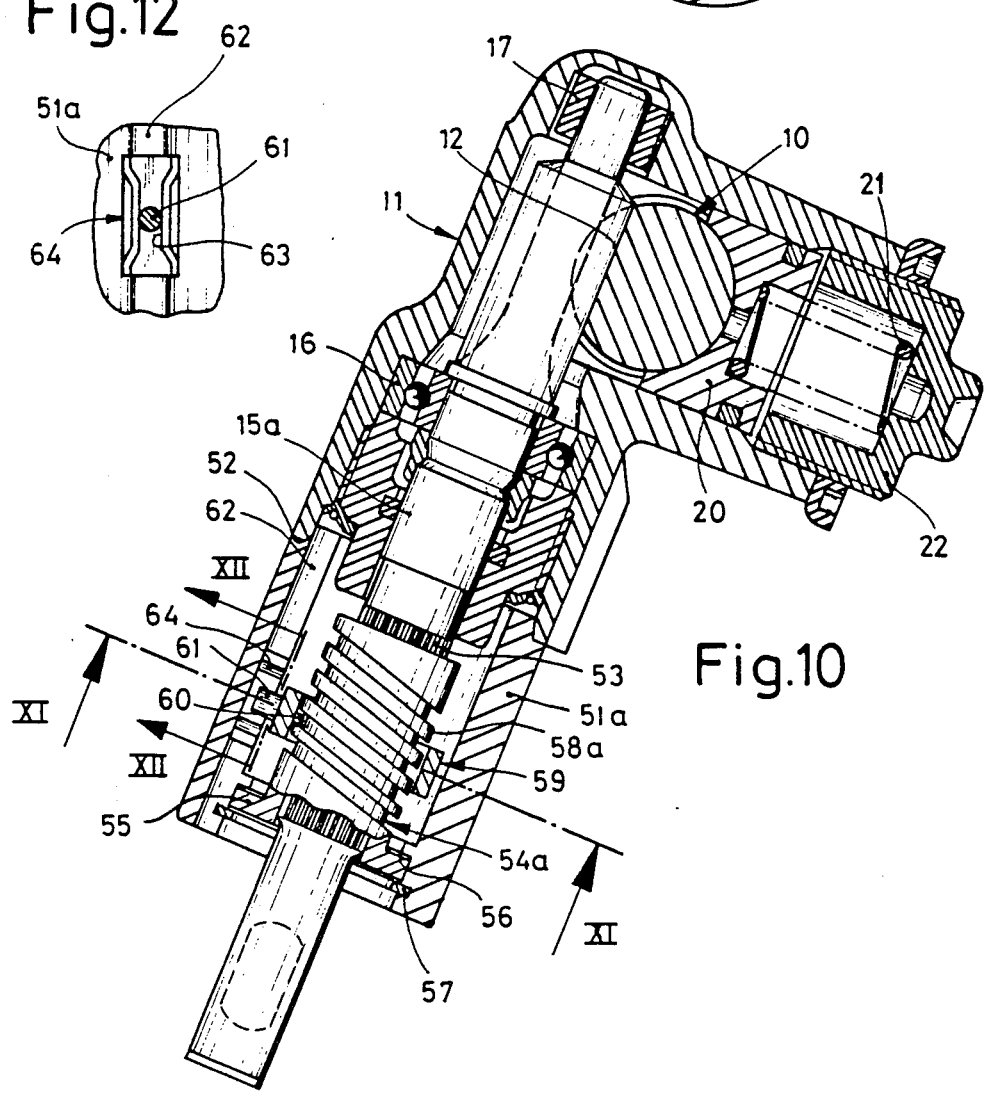

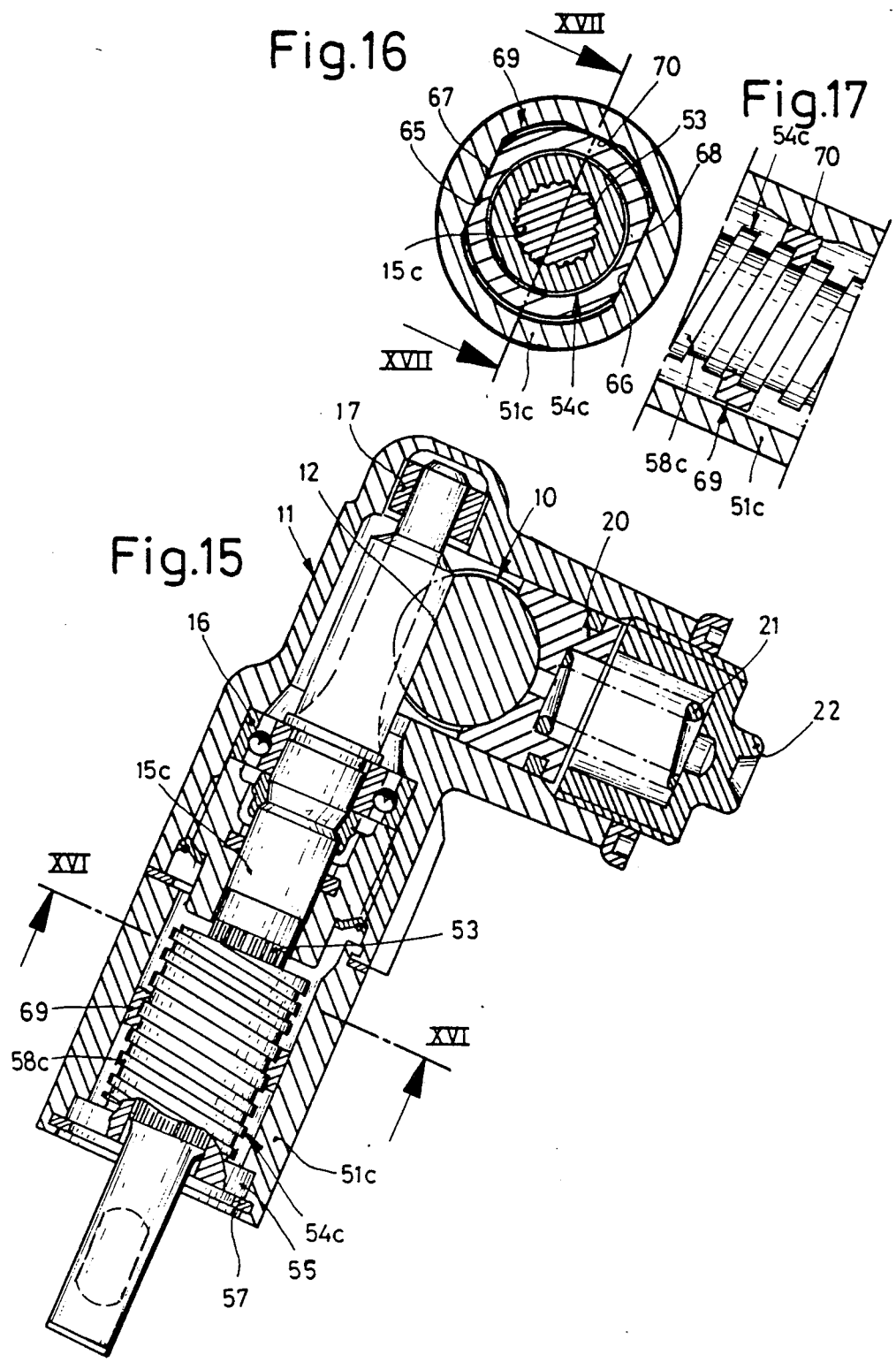

RACK AND PINION STEERING GEAR

BACKGROUND OF THE INVENTION

1. Field of the Invention

The invention pertains to a rack and pinion steering system, especially for motor vehicles, with a toothed rack that can be axially displaced in a steering gear housing, with a pinion driven by the steering wheel and actuating the toothed rack and with a spring-loaded pressure part supported in the steering gear housing which serves to generate a certain pressure between the toothed rack and the pinion.

2. Description of the Prior Art

Known rack and pinion steering systems of the type described above have the feature that although when new, the steering torque is constant in all steering positions, with increasing operating time there is a decrease in steering torque in the central steering region (straight-ahead driving), so that the steering becomes much looser in the center region. The reason for this is a reduction in the friction between natural wear. This is because extreme steering inputs are relatively rare during day-to-day operation of the vehicle, so that in practice, the toothed rack becomes more worn in the center region (straightaways and slight curves) than in the positions at each end. As a result of the looseness caused by wear in the center region, the driver feels that the steering is tighter when turning out of this region (in curves).

The above-mentioned problem is a well-known one with rack and pinion steering systems, and there also already exist a variety of suggested solutions aimed at ensuring that the steering force needing to be applied by the driver or at least the subjectively perceived feel during steering actuation, is an uniform as possible in all steering situations. Known measures are essentially based on the idea of raising the pressure between the toothed rack and the pinion in the center region. This purpose is achieved, for example, in a solution disclosed in German Patent DE-OS 24 58 320, by giving the toothed rack a crowned shape at its center.

German Patent DE-OS 33 32 483 discloses the process of adjusting the play between the toothed rack guide and the rear support of the toothed rack so that it is less in the center position of the toothed rack and larger towards the two ends of the toothed rack. In practice, this is achieved—as with the aforesaid DE-OS 24 58 320—by making the toothed rack thicker in its center region.

Lastly, according to German Patent DE-OS 25 26 487, increased pressure between the pinion and the toothed rack in its center region is achieved by a flexible crowning of the toothed rack, associated with direct attachment thereof to the tie rod. Alternatively, it is said that the same can be achieved with an uncrowned toothed rack, although a specifically placed shaft-like springing means would be necessary for the purpose.

SUMMARY OF THE INVENTION

The aim of this invention is to bring about with simple means an increase in steering torque in the center region of the steering system, i.e., during driving on straightaways and under small steering inputs, without thereby changing the steering geometry and/or raising the pressure between pinion and toothed rack in its center region. According to the invention, this aim is achieved in a rack and pinion steering system of the type mentioned, by the fact that means which increase the coefficient of friction only in the region corresponding to straight-ahead driving are provided on one or more surfaces of the steering system which are in frictional contact with one another during the steering process (friction points). The basic idea of the invention is therefore to change the coefficient of friction (and not the pressure between pinion and toothed rack) in the center region of the steering system, since it is possible by defining a different coefficient of friction to achieve optimum adjustment of the tightness of the steering gear.

One significant advantage of the invention based on changing the coefficient of friction lies in a noticeable reduction in cost, since the geometry of the toothed rack remains unchanged and no additional means are needed to change the pressure of the pinion against the toothed rack. Furthermore, the invention allows optimum adjustment of the degree of tightness or looseness in the steering over the entire steering range. It is also very advantageous in that when parts are replaced, no work needs to be done on the steering gear already present. In fact, excessive play and expressive looseness in the steering in the center region can easily be eliminated during service later on.

According to one embodiment of the invention distinguished by easy practical implementation, it is recommended that the measures raising the coefficient of friction be provided only on the toothed rack itself, namely, on a surface region which is in frictional contact with an opposing part only during straight-ahead driving. In this context, the spring-loaded pressure part which is solidly attached to the steering gear can serve as the opposing part for the surface region of the toothed rack treated so as to increase its coefficient of friction.

In the event that the end of the toothed rack facing away from the engagement point of the pinon is guided in a bushing placed in the steering gear housing, it is also feasible as an alternative for the bushing to serve as the opposing part for the surface region of the toothed rack treated so as to increase its coefficient of friction.

The measures to increase the coefficient of friction taken with respect to the toothed rack can consist, for example, of the fact that the surface region of the toothed rack corresponding to straight-ahead driving is sprayed with a medium which permanently increases the coefficient of friction. Galvanic application of a surface coating to increase the coefficient of friction is also alternatively possible.

According to another advantageous embodiment, the surface region of the toothed rack corresponding to straight-ahead driving can be etched in a manner which raises the coefficient of friction. Lastly, however, it is also possible to mechanically attach to the surface region of the toothed rack corresponding to straight-ahead driving a part which raises the coefficient of friction, configured as a ring, pin or the like. It can be attached by being bolted, pressed in, snapped or in in other similar ways.

Particularly suitable for application of the invention is a rack and pinion steering system with a slider that is placed at the connection point between the tie rod and the toothed rack between the pivot bosses of the tie rods and the toothed rack, through which pass the two attachment bolts for the tie rod, and which is carried along axially during the steering process together with the toothed rack. In this case, the invention can be advantageously embodied by having the inner wall of the steering gear housing, at the point at which the slider is located during straight-ahead driving, shaped like a cam, so that the slider comes into frictional contact with the cam-shaped point (friction point) on the steering gear housing only during straight-ahead driving.

It is useful if the portions of the slider which come into frictional contact with the friction point on the steering gear housing consist of plastic and are made to be elastic.

The invention can also be realized in an alternative embodiment of its basic idea by having the measures raising the coefficient of friction provided between the pinion and a steering gear housing part which surrounds the latter, preferably interposing an intermediate part engaging, on the one hand, with the pinion, and on the other hand, with the housing part. It is useful for this purpose if the rear part of the pinion possesses a screw thread which acts together with a sleevelike intermediate part surrounding the screw thread and engaging therewith. The screw thread is surrounded by a housing part attached to the steering gear housing or joined to the latter as a single unit. In this case, the intermediate part is frictionally engaged with the inner wall of the housing part or a part joined to the inner wall.

The advantage of this alternative solution is that no measures to raise the coefficient of friction are required on the toothed rack or on the pressure part of the toothed rack. Rather, the said measures are confined to the easily accessible rear region of the steering gear.

BRIEF DESCRIPTION OF THE DRAWINGS

FIG. 4 illustrates detail A from FIG. 3, enlarged with respect to FIG. 3;

FIG. 5 illustrates a section along line V—V in FIG. 4;

FIG. 6 illustrates detail B from FIG. 3, greatly enlarged with respect to the front view in FIG. 3;

FIG. 7 illustrates the subject of FIG. 6, seen in top plan view;

FIG. 8 illustrates a section along line VIII—VIII in FIG. 7;

FIG. 9 illustrates a diagrammatic representation of the change in steering torque as a function of steering input angle;

FIG. 10 illustrates an embodiment, modified as compared to FIG. 2, of a steering gear for a rack and pinion steering system, in vertical longitudinal section;

FIG. 11 illustrates a section along line XI—XI in FIG. 10;

FIG. 12 illustrates a section along line XII—XII in FIG. 10;

FIG. 15 illustrates a further embodiment of a steering gear, illustrated as in FIGS. 10 and 13;

FIG. 16 illustrates a section along line XVI—XVI in FIG. 15; and

FIG. 17 illustrates a section along line XVII—XVII in FIG. 16.

DESCRIPTION OF PREFERRED EMBODIMENT

Figure 1:
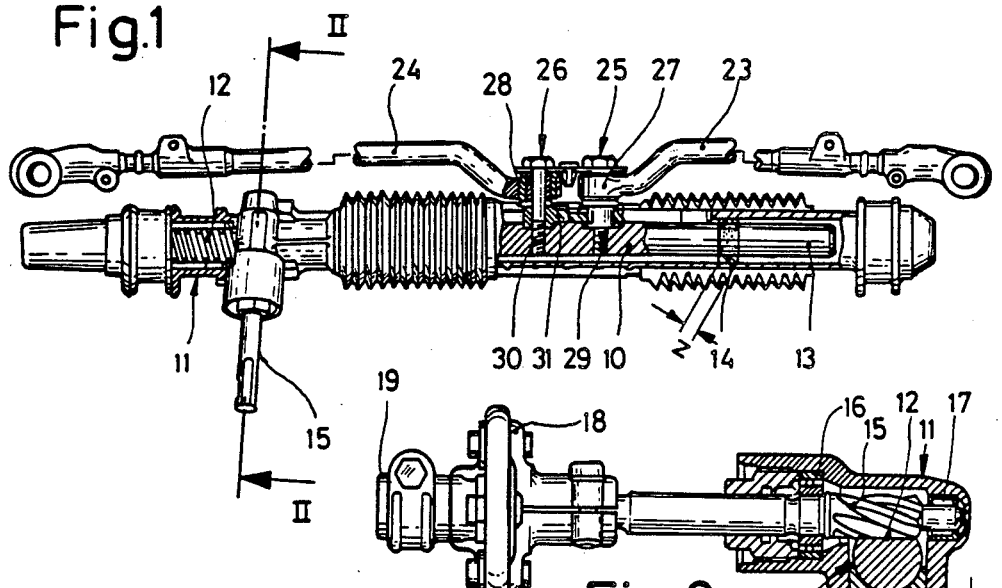
FIG. 1 illustrates a rack and pinion steering system for motor vehicles (partially cut away) in top plan view.
Figure 2:
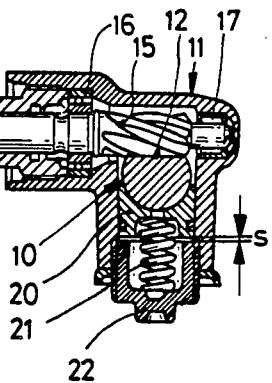
FIG. 2 illustrates a section along line II—II in FIG. 1, enlarged with respect to FIG. 1.
Figure 3:
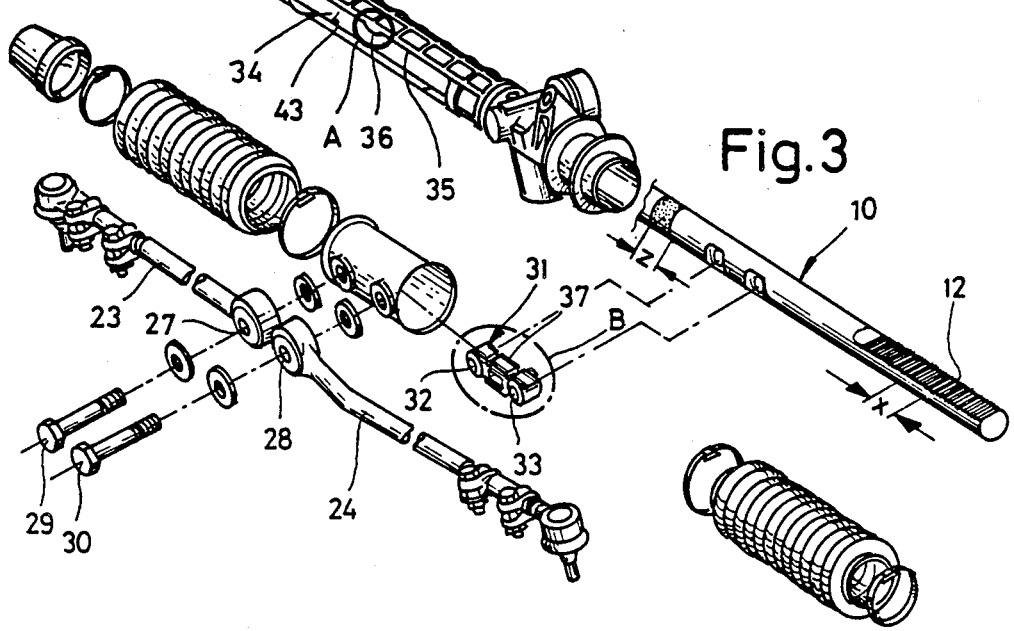
FIG. 3 illustrates an exploded view of the rack and pinion steering system according to FIG. 1, seen in perspective view from the front against the direction of motion.

In the rack and pinion steering system for a motor vehicle illustrated in FIGS. 1-3 together, item 10 designates a toothed rack that can move back and forth axially in a steering gear housing 11. However, the toothed rack 10 has diagonal gearing only at one end—at 12—while the other end 13 is smooth and is guided in a bushing 14 placed in the steering gear housing 11.

As especially shown in FIG. 2, the gearing 12 on the toothed rack 10 is functionally engaged with a pinion 15 which is mounted at 16 and 17 in the steering gear housing 11 and can be actuated—by means of a shock-absorbing elastic coupling member 18—by the steering shaft designated 19. The only partially illustrated steering shaft 19 is rotated by means of the torque applied by the driver to the steering wheel (steering torque), in a manner which is usual and therefore not shown in greater detail. As FIG. 2 further shows, the required pressure between the gearing 12 on the toothed rack 10 and the pinion 15 is exerted by a pressure part 20, which acts upon the back surface of the toothed rack 10 facing away from the gearing 12. The back of the pressure part 20 is in turn pressed upon by a compression spring 21, whose back end presses against a threaded bushing 22 screwed into the gear housing 11 and adjustable over the clearance distances.

FIGS. 1 and 3 show the tie rod for the steering system. It is configured as a so-called split tie rod and thus consists of two parts 23 and 24. The two parts 23, 24 of the tie rod are—as particularly illustrated by FIG. 1—each pivotally attached in the center region of the toothed rack 10 at 25 and 26, respectively. The pivots 25, 26 each consist of a pivot boss 27 and 28, bent inward at right angles, through which passes an attachment bolt 29 and 30 bolted into the toothed rack 10. To maintain spacing, a slider 31 is placed between the pivot bosses 27, 28 for the tie rods 23, 24 and the toothed rack 10. The slider 31 is shown separately in FIG. 3 (but also compare especially the enlarged views in FIGS. 6, 7 and 8). It consists entirely of plastic and has two metal guide bushings 32, 33—for example, incorporated by molding or injection-molding—for the attachment bolts 29, 30 which pass through the slider 31.

When the vehicle is moving straight ahead, the slider 31 is located at approximately the level in the steering gear housing 11 visible in FIG. 1. The corresponding point in the steering gear housing 11 is marked with circle A in FIG. 3. FIG. 3 furthermore illustrates that the steering gear housing 11 has at this point an axially oriented and relatively wide slit 34. As shown by the enlarged illustrations of this region of the steering gear housing in FIGS. 4 and 5, the steering gear housing 11 has an inwardly projecting cam-shaped bulge 36 at the upper limiting surface 35 of the slit 34. The geometrical shape of the cam is such that the curve 47, FIG. 39, or a similar curve specific to the vehicle results. An excessively steep increase in the drag torque in the center region can affect the "return characteristics" of the steering system. The height a, FIG. 4, of the cam-shaped bulge 36 should be approximately 1 mm, while the length b can extend to approximately 6 mm. The cam-shaped bulge 36 in the steering gear housing 11 is thus configured and placed so that it comes into frictional contact with the upper center part 37 of the slider 31 when the vehicle is driving straight ahead or around a slight curve. As already mentioned, the slider 31 and therefore also the center part 37 which comes into frictional contact with the cam-shaped bulge 36 is made of plastic. As seen especially in the enlarged illustration of the slider 31 in FIGS. 6–8, the upper center part 37—like the lower opposite part 38—of the slider 31 is configured to form an elastic lip. To prevent contact between the parts 39 and 40 of the slider 31 which surround the bushings 32, 33 and the cam-shaped bulge 36, it is useful if axially oriented grooves or channels are recessed into the surfaces 39, 40. These groove-shaped channels are illustrated in FIG. 7 and labeled 41 and 42. Alternatively, however, it is also possible to form the bulge 36 over only "half" the width of the steering housing, as shown in FIG. 5.

Of course, it is also possible or conceivable —alternatively or additionally—to provide for frictional contact with the steering gear housing 11 in the lower center region 38 of the slider 31. This would then require a corresponding cam-shaped bulge on the lower confining wall 43 (FIG. 3) of the longitudinal slit 34 in the steering gear housing 11. With regard to the need for groove-shaped channel on the parts on either side of the lower center region 38, the remarks above apply correspondingly.

According to a further alternative, it would also be conceivable to configure or place the cam-shaped bulge on the steering gear housing 11 so that it comes into frictional contact with the narrow side, designated 44 in FIG. 7, of the upper lip 37 (or lower lip 38) of the slider 31. The orientation of this alternative frictional contact is indicated in FIG. 7 with an arrow 45.

According to another embodiment, the center region of the toothed rack part, designated X in FIG. 3, is treated as a point near or opposite the gearing 12 so as to raise the coefficient of friction. The treatment to raise the coefficient of friction can consist of spraying the region X with a medium which permanently raises the coefficient of friction, or of galvanically applying a layer which raises the coefficient of friction. Etching the toothed rack to locally raise the coefficient of friction is also possible. Lastly, it is also possible to attach at the relevant point X mechanical parts which produce an appropriate rise in the coefficient of friction. The surface region X of the toothed rack 10 whose coefficient of friction has been raised compared to the other parts of the toothed rack is that part of the toothed rack 10 which is in frictional contact with the above-mentioned pressure part 20 (see FIG. 2) when the vehicle is moving straight ahead or through a slight curve. It is also possible in this manner to achieve a corresponding increase in the steering torque to be applied by the driver, in the most commonly used center region of the toothed end 12 of the toothed rack. Alternatively or additionally, the measures to raise the coefficient of friction can also be provided at the point on the toothed rack in the region of the mounting 14 designated Z.

FIG. 9 gives a vivid and graphic illustration of the effect of the local increase in coefficient of friction in the steering described above. The lines 46 essentially running parallel to the abscissa characterize the steering torque ($M_d$) to be applied by the driver during steering inputs to the right or left, which as expected—except for the center region Y corresponding to movement straight ahead or in a slight curve—essentially remains constant. The measures according to the invention explained above result in an increase in steering torque in the center region Y which is expressed as the upwardly convex solid line 47, referring to the vehicle in new condition. After the vehicle has been operated for a longer time, a steering torque profile approximately corresponding to the dotted line 48 exists, resulting from wear in the center region Y. For comparison, the dashed line 49 illustrates the steering torque profile in the center region Y without the measures according to the invention to raise the coefficient of friction, referring to the vehicle in new condition. After the vehicle has been used for a longer time, the steering torque profile in this region would then be approximately as illustrated by the dot-dash line 50.

The embodiments according to FIGS. 10–17 differ from the embodiments according to FIGS. 1–8 described above primarily in that the measures to raise the coefficient of friction are provided not on the toothed rack 10, but between the pinion 15a (FIGS. 10 and 11) or 15b (FIGS. 13 and 14) or 15c (FIGS. 15–17) and a housing part 51a (FIGS. 10–12) or 51b (FIGS. 13 and 14) or 51c (FIGS. 15–17) surrounding it. In each case, the housing part 51a, 51b, 51c represents a component of the steering gear housing 11, but it is configured as a separate part and attached at 52 to the steering gear housing 11. The housing part 51a, 51b, 51c thus to a certain extent forms the rear termination of the steering gear housing 11. Otherwise, however, the steering gear housing corresponds to the embodiment according to FIGS. 1 and 2 and is therefore—as it is there—designated as 11. The same applies to elements of the steering gear placed in the steering gear housing 11, with the exception of the above-mentioned pinion 15a, 15b or 15c.

The rear region of the pinion 15a, 15b or 15c, lying outside the actual steering gear housing 11 and surrounded by the housing part 51a, 51b or 51c, has splines 53 on which a threaded bushing 54a (FIGS. 10–12) or 54b (FIGS. 13 and 14) or 54c (FIGS. 15–17) is placed nonrotatably and in an axially immovable fashion. For this purpose, the threaded bushing 54a, 54b or 54c is supported by means of a collar 55 at one end against a protection 56 on the housing part 51a, 51b or 51c, and at the other end, against a retaining snap ring 57 recessed into the housing part.

In the embodiment according to FIGS. 10 and 11, the threaded bushing 54a has a uniformly pitched threaded portion 58a with threads approximately rectangular in cross-section. The threaded bushing 54a is surrounded by a sleeve-like intermediate part 59 which engages on the one hand with the threaded bushing 54a and therefore also with the pinion 15a, and on the other hand with the housing part 51a.

As also shown in FIGS. 10 and 11, the sleeve-like intermediate part 59 engages, by means of a pin 60 formed onto its inner surface and pointing radially inward, with the threaded portion 58a of the threaded bushing 54a. A pin member 61 pointing radially outward is formed on the outer circumference of the intermediate part 59 and is guided in an axial guide groove 62 on the inner wall of the housing part 54a. These embodiments clearly show that the sleeve-like intermediate part 59 is arranged so that it does not rotate, but can be axially displaced in the housing part 51a when the pinion 15a is actuated. In the course of this axial movement, the intermediate part 59 is frictionally engaged with the guide groove 62 by means of the pin member 61.

As we now see from FIG. 12, the guide groove 62 has a restriction 63 which increases the friction between the pin member 61 and the housing part 51a, which is formed by a spring element 64 inserted into the guide groove 62. The spring element 64 and therefore the restriction 63 which increases the coefficient of friction is inserted into the guide groove 62 at the point corresponding to the position occupied by the intermediate part 59 when the vehicle is moving straight ahead. In this position, as shown by FIGS. 10 and 12, the pin member 61 engages the restriction 63, and the intermediate part 59 thus presents an increased frictional resistance to actuation of the pinion 15a.

The above-described effect can be even further intensified if the threaded portion 58a of the threaded bushing 54a has a pitch in its center region corresponding to straight-ahead driving which is different from that in its end regions corresponding to driving on curves.

Figure 14:
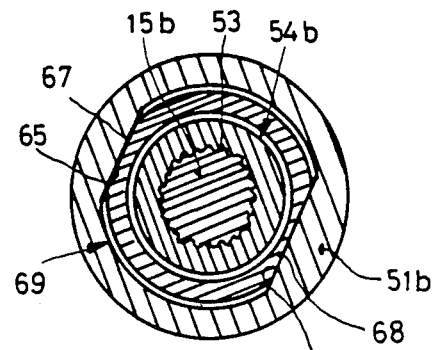
FIG. 14 illustrates a section along line XIV—XIV in FIG. 13.
Figure 13:
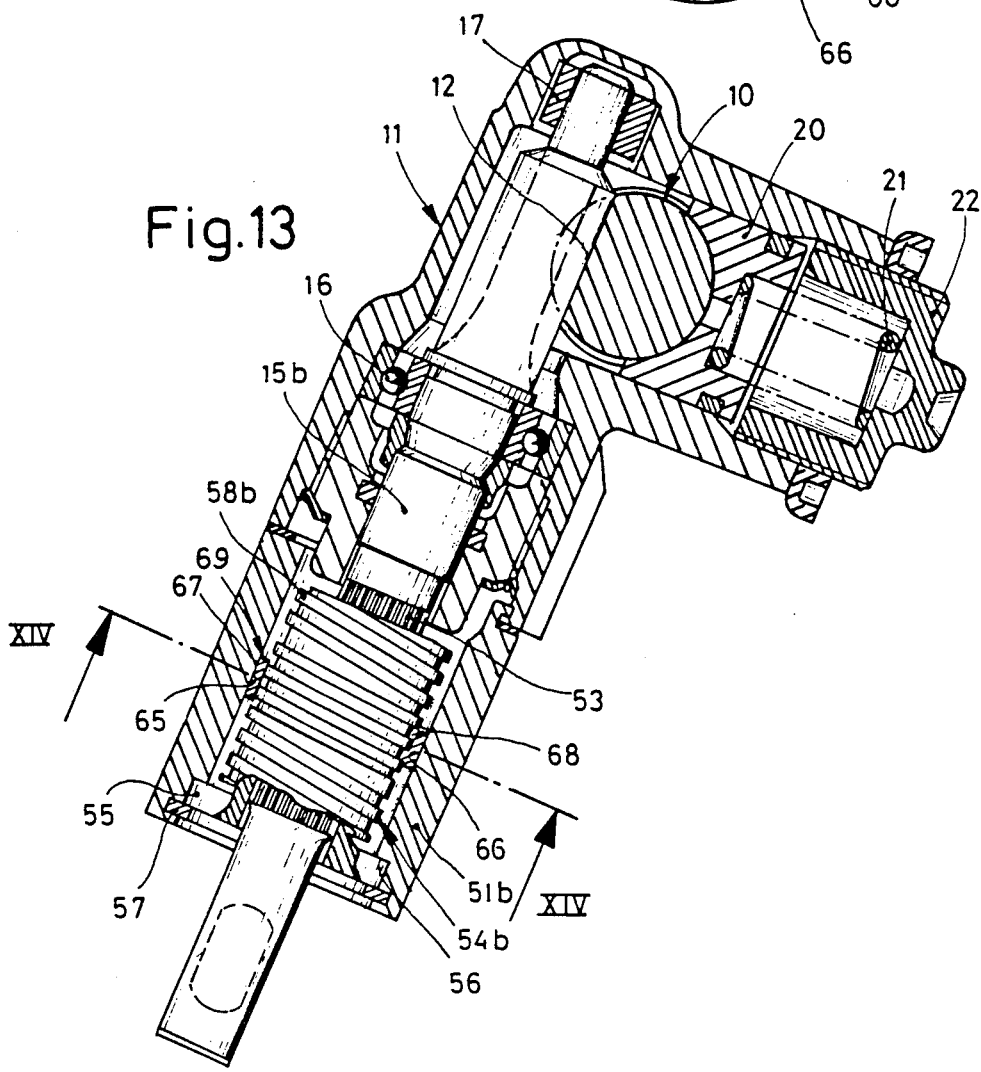
FIG. 13 illustrates a further embodiment of a steering gear, illustrated as in FIG. 10.

The embodiment according to FIGS. 13 and 14 differs from the variants according to FIGS. 10–12 firstly in the configuration of the threaded portion 58b on the threaded bushing 54b. Specifically, the threaded bushing 54b according to FIGS. 13 and 14 has several threaded sections with different thread pitches. A further difference as compared to the embodiment according to FIGS. 10–12 is the fact that in the embodiment according to FIGS. 13 and 14, the inner wall of the housing part 51b is flattened at two diametrically opposed points 65 and 66. The housing part 51b is operationally engaged there with two corresponding flattened areas 67, 68 on the sleeve-like intermediate part here designated as 69. This keeps the intermediate part 69 from twisting in the housing part 51b. Frictional engagement between the surfaces 65, 67 and 66, 68 results. The different thread pitches on the threaded bushing 54b result in correspondingly different speeds during axial displacement of the intermediate part 69 when the pinion 15b is actuated. The frictional resistance offered by the intermediate part is correspondingly different. It is useful if the pitch of the threaded portion 58b is designed so that the frictional resistance is greatest when the intermediate part 69 is located at the point on the threaded bushings 54b corresponding to straight-ahead motion of the vehicle.

The threaded portion 58b of the threaded bushing 54b can be made to work together with the intermediate part 69 as in the embodiment according to FIGS. 10–12, i.e., by means of a pin projecting radially inward (not shown in FIGS. 13 and 14). As an alternative, however, it is also possible to provide the intermediate part 69 with an internal threaded portion of the same pitch, so that the different frictional resistance values result from the differences in screw pitch between the threaded bushing 54b, on the one hand, and the intermediate part 69, on the other hand.

The embodiment according to FIGS. 15–17 essentially corresponds in terms of design and operation to the embodiment according to FIGS. 13 and 14. One difference, however, is the fact that in the embodiment according to FIGS. 15–17, the threaded bushing 54c has a threaded portion 58c of constant pitch. In addition, to raise the coefficient of friction between the housing part 51c and the intermediate part 69, a cam 70 designed to increase the friction between housing part 51c and intermediate part 69 is formed onto the inner wall of the housing part 51c at a point corresponding to the position of the intermediate part 69 during straight-ahead driving (cf. especially FIG. 17).

The embodiments of the invention in which an exclusive property or privilege is claimed are defined as follows:

1. In a rack and pinion steering gear of the type including,
   a housing,
   an elongated steering rack having a plurality of rack teeth thereon,
   means for mounting said steering rack in said housing for sliding movement in opposite directions from a center position corresponding to straight ahead driving,
   a pinion gear rotatably supported on said housing with a plurality of pinion gear teeth thereon meshing with said rack teeth so that rotation of said pinion gear in opposite directions effects corresponding sliding movement of said steering rack on said housing,
      friction force developed between said pinion gear teeth and said rack teeth during rotation of said pinion gear resisting turning of said pinion gear and having a minimum magnitude generally at said center position of said steering rack due to maximum wear between those of said pinion gear teeth and said rack teeth in mesh at substantially said center position of said steering rack, and
   resilient support means on said housing slidably engaging said steering rack opposite said pinion gear for resiliently biasing said steering rack against said pinion gear,
   apparatus for simulating said friction force as a function of the position of said steering rack relative to said housing, comprising:
   means for defining a friction increasing surface,
   means for connecting said friction increasing surface to said steering rack at an end of said steering rack remote from said rack teeth for unitary movement with said steering rack, relative to said housing, and
   means on said housing remote from said resilient support means for frictionally slidably engaging said friction increasing surface only when said steering rack is substantially in said center position and exerting said friction increasing surface statically balanced compressive forces normal to said friction increasing surface,
      said normal forces on said friction increasing surface developing friction forces between said steering rack and said housing providing a relative increase in the resistance to turning movement of said pinion gear at substantially said center position of said steering rack.

2. In a rack and pinion steering gear of the type including,
   a housing,
   an elongated steering rack having a plurality of rack teeth thereon and a cylindrical surface portion remote from said rack teeth,
   means including an annular bushing between said steering rack and said housing mounting said steering rack on said housing for sliding movement in opposite directions from a center position corresponding to straight ahead driving,
   a pinion gear rotatably supported on said housing with a plurality of pinion gear teeth thereon meshing with said rack teeth so that rotation of said pinion gear in opposite directions effects corresponding sliding movement of said steering rack on said housing, the friction force developed between said pinion gear teeth and said rack teeth during rotation of said pinion gear resisting turning of said pinion gear and having a minimum magnitude generally at said center position of said steering rack due to maximum wear between between those of said pinion gear teeth and said rack teeth in mesh at substantially said center position of said steering rack, and resilient support means on said housing slidably engaging said steering rack opposite said pinion gear for resiliently biasing said steering rack against said pinion gear, apparatus for simulating said friction force as a function of the position of said steering rack relative to said housing comprising:

means for defining an annular bearing surface on said bushing in 360 degree sliding contact with said steering rack cylindrical surface portion during sliding movement of said steering rack relative to said housing, and means for defining a friction increasing surface portion on said steering rack cylindrical surface portion having a coefficient of friction exceeding the coefficient of friction of said cylindrical surface portion and slidably engageable on said annular bearing surface of said bushing only when said steering rack is substantially in said center position, said annular bushing exerting normal forces on said friction increasing surface portion operative to increase the sliding friction between said steering rack and said housing whereby a relative increase in the resistance to turning movement of said pinion gear is achieved at substantially said center position of said steering rack.

* * * * *